US012147658B2

(12) United States Patent
Goetgeluk et al.

(10) Patent No.: US 12,147,658 B2
(45) Date of Patent: Nov. 19, 2024

(54) DATA MANAGEMENT AND PERFORMANCE TRACKING SYSTEM FOR WALKABLE OR INTERACTIVE VIRTUAL REALITY

(71) Applicant: Virtuix Holdings Inc., Austin, TX (US)

(72) Inventors: Jan Goetgeluk, Austin, TX (US);
Cameron Slayter, Austin, TX (US);
Pramod Ramesh, Austin, TX (US)

(73) Assignee: Virtuix Holdings Inc., Austin, TX (US)

( * ) Notice: Subject to any disclaimer, the term of this patent is extended or adjusted under 35 U.S.C. 154(b) by 476 days.

(21) Appl. No.: 17/281,867

(22) PCT Filed: Oct. 1, 2019

(86) PCT No.: PCT/US2019/054164
§ 371 (c)(1),
(2) Date: Mar. 31, 2021

(87) PCT Pub. No.: WO2020/072558
PCT Pub. Date: Apr. 9, 2020

(65) Prior Publication Data
US 2021/0397334 A1 Dec. 23, 2021

Related U.S. Application Data

(60) Provisional application No. 62/739,676, filed on Oct. 1, 2018.

(51) Int. Cl.
*G06F 3/04847* (2022.01)
*A63F 13/537* (2014.01)
*G06F 3/01* (2006.01)

(52) U.S. Cl.
CPC ........ *G06F 3/04847* (2013.01); *A63F 13/537* (2014.09); *G06F 3/011* (2013.01); *A63F 2300/8082* (2013.01); *G06F 2203/012* (2013.01)

(58) Field of Classification Search
CPC ............... G06F 3/04847; G06F 3/011; G06F 2203/012; A63F 13/537; A63F 2300/8082
See application file for complete search history.

(56) References Cited

U.S. PATENT DOCUMENTS

| 7,828,661 | B1* | 11/2010 | Fish | A63F 13/795 709/204 |
| 2006/0080702 | A1* | 4/2006 | Diez | A63F 13/71 725/31 |

(Continued)

FOREIGN PATENT DOCUMENTS

| WO | 2017019884 A1 | 2/2017 |
| WO | 2017180990 A1 | 10/2017 |
| WO | 2020072558 A1 | 4/2020 |

OTHER PUBLICATIONS

International Search Report and Written Opinion for PCT Application PCT/US2019/054164 issued on Dec. 30, 2019, 7 pages.

(Continued)

*Primary Examiner* — Steve Rowland
(74) *Attorney, Agent, or Firm* — Polsinelli PC

(57) ABSTRACT

Disclosed are system, methods and non-transitory computer readable mediums for performance tracking, which can include an omnidirectional locomotion system (configured with one or more virtual reality games, omnidirectional treadmill and a sensor array), a leaderboard development interface; and a leaderboard creation GUI configured to create a leaderboard GUI. In some instances, the sensor array is attached to a user within the omnidirectional treadmill. In other instances, the sensor array is located on or within the omnidirectional treadmill.

18 Claims, 20 Drawing Sheets

(56) References Cited

U.S. PATENT DOCUMENTS

| | | | |
|---|---|---|---|
| 2013/0331181 | A1 | 12/2013 | Newton et al. |
| 2017/0076553 | A1* | 3/2017 | Washington .......... A63F 13/352 |
| 2017/0243433 | A1 | 8/2017 | Luciano, Jr. |
| 2017/0259155 | A1* | 9/2017 | Park ................... A63B 24/0087 |
| 2017/0269685 | A1 | 9/2017 | Marks et al. |
| 2018/0147442 | A1* | 5/2018 | Moon ................ A63B 22/0285 |
| 2019/0134457 | A1* | 5/2019 | Chen ....................... G06F 3/011 |
| 2019/0224521 | A1* | 7/2019 | Olsson ............... A63B 22/0285 |

OTHER PUBLICATIONS

Extended European Search Report, EP Application No. 19868753.5; mailed May 11, 2022.
Virtuix: "Virtuix Omni Owner's Manual", Oct. 31, 2017, pp. 1-43. Retrieved from the Internet: URL:http://www.virtuix.com/wp-content/uploads/2017/10/Virtuix-Omni-Owner-Manual.pdf [retrieved on Apr. 30, 2022].
Virtuix Omni: "Virtuix Omni—Omni Arena (HTC Vive only)", Jan. 31, 2017, XP055916775, Retrieved from the Internet: URL http://www.youtube.com/watch?v=5jea-7I5HIA [retrieved on Apr. 30, 2022].
Virtuix Omni: "Screenshots of Video Virtuix Omni—Omni Area", Jan. 31, 2017, XP055916775, Retrieved from the Internet: URL http://www.youtube.com/watch?v=5jea-715HIA [retrieved on Apr. 30, 2022].
International Search Report and Written Opinion; PCT Application No. PCT/US2019/054164; mailed Dec. 30, 2019.

\* cited by examiner

FIG. 3A

| Achievement | Description | AP |
|---|---|---|
| Mobile | Reach 100 overall steps on the Omni | 5 AP |
| Sure-footed | Reach 500 overall steps on the Omni | 10 AP |
| Strider | Reach 1000 overall steps on the Omni | 25 AP |
| Wanderer | Reach 2000 overall steps on the Omni | 50 AP |
| Traveler | Reach 4000 overall steps on the Omni | 75 AP |
| Iron Legs | Reach 8000 overall steps on the Omni | 100 AP |
| Pathfinder | Reach 16000 overall steps on the Omni | 200 AP |
| Voyager | Reach 32000 overall steps on the Omni | 400 AP |
| Trailblazer | Reach 64,000 overall steps on the Omni | 800 AP |
| Pioneer | Reach 100,000 overall steps on the Omni (~400 5 min sessions) | 1000 AP |
| Legend | Reach 500,000 overall steps on the Omni (Will take years) | 5000 AP |

FIG. 3B

| Achievement | Description | AP |
|---|---|---|
| Arena Combatant | Finish your first round of Omni Arena Core Defense | 25 AP |
| Arena Challenger | Competed in your first round of Omni Arena Hardpoint | 25 AP |
| Metropolis | Played a game of Core Defense on the Metropolis map | 25 AP |
| Coliseum | Played a game of Core Defense on the Coliseum map | 25 AP |

FIG. 3C

| Achievement | Description | AP |
|---|---|---|
| Power Core Defender | End a Core Defense Round with the core health above 0% | 25 AP |
| Power Core Protector | End a Core Defense round with the core health above 90% | 50 AP |
| Core Defense Gold | Achieve Gold or better in one Core Defense round | 100 AP |
| Core Defense Platinum | Achieve Platinum in one Core Defense round | 100 AP |
| Core Defense Master | Achieve Platinum on all 3 Core Defense rounds | 200 AP |
| Core Defense Coop | Play Omni Arena Core Defense with 1, 2, or 3 friends | 100 AP |
| Core Defense Maps | Complete a Core Defense match in Metropolis & Coliseum | 25 AP |
| Hardpoint Winner | Win your first game in hardpoint | 100 AP |

FIG. 3D

| Achievement | Description | AP |
|---|---|---|
| Gunslinger | Achieve Gold or better in a Core Defense round without using any heavy weapons | 75 AP |
| Multi-kill | Kill 10 enemies within 2 seconds. | 50 AP |
| Heavy Weapon Master | Use a heavy weapon 15 times in one match | 50 AP |
| Headshots Galore | Get 50 headshots in one match | 50 AP |
| Winning Streak | Win 3 Hardpoint matches in a row | 100 AP |
| Kill Streak | Get 5 kills in a row in Omni Arena Hardpoint w/o dying | 50 AP |

FIG. 3E

The "Game Selection Achievements" reward the player for playing a variety of games. Players will naturally focus on their preferred genre first, but these achievements will encourage players to try some of the other games.

| Achievement | Description | AP |
|---|---|---|
| Popular Gamer | Play the following games: Omni Arena, VRZ Torment, Primordian, Affected: The Manor | 300 AP |
| Multiplayer Gamer | Play a multiplayer game of the following games: Omni Arena, VRZ Torment, Hyperdrome. | 200 AP |
| Horror Gamer | Play the following games: The Exorcist: Legion VR, Affected: The Manor, Dreadhalls, Shadow Ops, The Bellows | 100 AP |
| Shooter Gamer | Play the following games: Omni Arena, VRZ Torment, Vindicta, Shadow Ops, Training Ops, Hyperdrome, Quell 4D | 100 AP |
| Adventure Gamer | Play the following games: Primordian, Karnage Chronicles, Coin Rush, Nature Treks, Project Ghost | 100 AP |
| Arcade Gamer | Play the following games: Omni Arena, Vindicta, Training Ops, Bow Master, Coin Rush | 100 AP |
| Omni Gamer | Gain all the following Achievements: Popular Gamer, Multiplayer Gamer, Horror Gamer, Shooter Gamer, Adventure Gamer, Arcade Gamer | 500 AP |
| Diversity Gamer | Play 10 different games | 100 AP |

FIG. 3F

"Player Profile Achievements" reward the player for actions that the player performs with their player account in the "Player Hub".

| Achievement | Description | AP |
| --- | --- | --- |
| Setup Complete | Finish the player profile setup for your profile. | 100 AP |
| Friend Maker | Add an friend. | 100 AP |
| Friend Invite | Invite a friend to create an account. | 50 AP |
| Facebook Sharer | Share a video of your experience on Facebook. | 100 AP |
| Twitter Sharer | Tweet a video of your experience on Twitter. | 100 AP |
| Preferred Location | Set your preferred location that you like to play at. | 100 AP |

FIG. 3G

These achievements reward the player for returning multiple times a month and are tied to a monthly mission system. Each month, a new list of monthly missions becomes available for players to achieve. The monthly achievements are attainable each month, regardless of whether the player has attained them in previous months. Completing all the monthly missions for a given month provides the player with an AP bonus.

| Achievement | Description | AP |
| --- | --- | --- |
| Two-in-one | Played 2 FPS games in a day. | 100 AP |
| Monthly Shooter | Play an FPS game. | 50 AP |
| Co-op Gamer | Play a coop game. | 50 AP |
| Survey Taker | Take the monthly survey. | 50 AP |
| Running from Zombies | Burned 100 calories playing VRZ in a day. | 100 AP |
| Zombie Killer | Played 3 VRZ games in a week | 50 AP |
| Leaderboard Competitor | Competed in 2 Leaderboard competitions in a month. | 100 AP |
| Multiplayer Fanatic | Played 5 multiplayer games in a month. | 100 AP |
| Monthly Runner | Completed 5000 steps on the Omni in a month. | 100 AP |
| Omni Expert | Played 25 game sessions overall. | 100 AP |
| Beta Tester | Completed 5 feedback surveys sharing your experience. | 100 AP |

FIG. 3H

The Elite Program rewards players for being a regular customer. Each customer will be given an Elite ranking depending on the amount of achievement points they have gained within a given year. We can offer different rewards based on the player's Elite ranking. This system is similar to rewards programs that many businesses do to encourage repeat business.

| Ranking | Description |
|---|---|
| Casual | 0-500 Achievement points per year (~0-4 visits per year) |
| Initiate | 500-3000 Achievement points per year (~5-8 visits per year) |
| Pro | 3000-10,000 Achievement points per year (~9-12 visits per year) |
| Veteran | 10,000-50,000 Achievement points per year (~13-39 visits per year) |
| Elite | 50,000+ Achievement points per year (~50+ visits per year) |

FIG. 4A

OMNIVERSE

ADMIN MENU
Content Admin
Usage Data Statistics
Location Admin
Player Accounts Admin
Competition Admin
   Leaderboard Manager
   Tournament Manager
Live Feed Admin

Competition Admin

Leaderboard Manager

*Virtuix Omni*

[ New Leaderboard ⊕ ]

Virtuix Leaderboards

Show: [ Active Leaderboards ▽ ]

| Leaderboard Name | Game Name | Game Mode / Level | Time Type | Time Range | Actions | | |
|---|---|---|---|---|---|---|---|
| Daily Core Defense Contest | Omni Arena | Core Defense Easy (2-player) | Daily (Recurring) | 5/22/2018 - 5/29/2018 | View | Archive | Delete |
| Custom Core Defense Leaderboard | Omni Arena | Core Defense Easy (4-player) | Custom | 5/23/2018 5:00 AM - 5/23/2018 11:59 PM | View | Archive | Delete |
| Weekly Core Defense Contest | Omni Arena | Core Defense Hard (4-player) | Weekly (Recurring) | 5/26/2018 - 6/20/2018 | View | Archive | Delete |
| All-Time Training Ops Gauntlet Contest | Training Ops | Gauntlet | All-Time | ----- | View | Archive | Delete |

FIG. 4B

OMNIVERSE

ADMIN MENU
Content Admin
Usage Data Statistics
Location Admin
Player Accounts Admin
Competitive Admin
Leaderboard Manager
Tournament Manager
Live Feed Admin

*Virtuix* Omni

New Leaderboard

| | Status | View Leaderboard |
|---|---|---|
| | Completed | View |
| | Not Started | View |
| | In Progress | View |
| | In Progress | View |

Create New Leaderboard

Halloween Weekend Tournament
*Leaderboard Title*

10/29 - 10/31 | Omni Arena Core Defense | Omniverse Account Required
*Subtitle*

To participate in this Omni Arena tournament, you must play Omni Arena Core Defense within the specified time. Omniverse account is required. Only US participants are eligible. Ask the attendant for more details.
*Description / Messaging*

Prize Pool ▽        $1000
*Competition Type*        *Prize Pool Amount ($USD)*

Yes ▽
*Display Tiebreaker Column?*

Cancel        Next

FIG. 4D

OMNIVERSE

ADMIN MENU

Content Admin
Usage Data Statistics
Location Admin
Player Accounts Admin

Competition Admin

Leaderboard Manager
Tournament Manager

Live Feed Admin

Competition Admin

Leaderboard Manager

Virtuix Omni

Virtuix Leaderboards

Show: Active Leaderboards ▽

New Leaderboard ⊕

| Leaderboard Name | Game Name | Game Mode / Level | Time Type | Time Range | Actions | | |
|---|---|---|---|---|---|---|---|
| Daily Core Defense Contest | Omni Arena | Core Defense Easy (2-player) | Daily (Recurring) | 5/22/2018 - 5/29/2018 | View | Active | Delete |
| Custom Core Defense Leaderboard | Omni Arena | Core Defense Easy (4-player) | Custom | 5/23/2018 5:00 AM - 5/23/2018 11:59 PM | View | Active | Delete |
| Weekly Core Defense Contest | Omni Arena | Core Defense Hard (4-player) | Weekly (Recurring) | 5/20/2018 - 6/20/2018 | View | Active | Delete |
| All-Time Training Ops Gauntlet Contest | Training Ops | Gauntlet | All-Time | ------ | View | Active | Delete |

FIG. 4E

Ⓞ M N I V E R S E  Competition Admin  *Virtuix* Ⓞmni

ADMIN MENU
Content Admin
Usage Data Statistics
Location Admin
Player Accounts Admin

Competition Admin
   Leaderboard Manager
   Tournament Manager
   Live Feed Admin Leaderboard Manager 》 Daily Core Defense Contest

Leaderboard Details

| Leaderboard Name | Daily Core Defense Contest |
|---|---|
| Game Name | Omni Arena |
| Game Mode / Level | Core Defense Easy (2-player) |
| Timing | Daily (Recurring) |
| Start Time | 5:00 AM CST |
| Recurrence Pattern | Every 1 Day |
| Recurrence Range | 5/22/2018 - 5/29/2018 |

[ Archive ]
[ Delete ]

Choose Recurring Leaderboard to View by Data

Date / Time:  5/22/2018 11:59 AM  📅 🕓

Leaderboard Data

| Rank | Omniverse Accounts | Score |
|---|---|---|
| 1 | cmslayter09 / sRutledge91 | 15,264 |
| 2 | pRamesh23 / jGoetgeluk35 | 13,256 |
| 3 | jGoetgeluk35 / Kel.Cam | 13,154 |
| 4 | Kel.Cam / BenDrakes | 12,956 |
| 5 | BenDrakes / Logan35 | 12,564 |
| 6 | Logan35 / dAllan64 | 12,314 |
| 7 | dAllan64 / dShuffield32 | 12,054 |
| 8 | dShuffield32 / pRamesh23 | 11,654 |
| 9 | sRutledge91 / cmslayter09 | 11,235 |
| 10 | Lbrothers3 / BenDrakes | 10,926 |

Previous  [1]  2  3  4  Next

FIG. 4F

ADMIN MENU
Content Admin
Usage Data Statistics
Location Admin
Player Accounts Admin
Competition Admin

Leaderboard Manager » Daily Core Defense Contest

Leaderboard Details

| Leaderboard Name | Daily Core Defense Contest |
|---|---|
| Game Name | Omni Arena |
| Game Mode / | |

Choose Recurring Leaderboard to View by Data

Date / Time: 5/22/2018 11:59 AM

Leaderboard Data

| Rank | Omniverse Accounts | Score |
|---|---|---|

FIG. 4G

Player Accounts Admin
Competition Admin
Leaderboard Manager
Tournament Manager
Live Feed Admin

| Leaderboard Name | Daily Core Defense Contest |
|---|---|
| Game Name | Omni Arena |
| Game Mode / Level | Core Defense Easy (2-player) |
| Timing | Daily (Recurring) |
| Start Time | 5:00 AM CST |

Date / Time: 5/22/2018 11:59 AM

Leaderboard Data

| Rank | Omniverse Accounts | Score |
|---|---|---|
| 1 | cmslayter09 / sRutledge91 | 15,264 |
| 2 | pRamesh23 / jGoetgeluk35 | 13,256 |
| 3 | jGoetgeluk35 / Kel.Cam | 13,154 |
| 4 | Kel.Cam / BenDrakes | 12,956 |
| 5 | BenDrakes / Logan35 | 12,564 |

FIG. 4H

| | | |
|---|---|---|
| 9 | sRutledge91 / cmslayter09 | 11,235 |
| 10 | Ljbrothers3 / BenDrakes | 10,926 |

Previous  1  2  3  4  Next

Archive
Delete

FIG. 4I

ADMIN MENU
Content Admin
Usage Data Statistics
Location Admin
Player Accounts Admin
Competition Admin
Leaderboard Manager
Tournament Manager
Live Feed Admin

Leaderboard Manager

Show: Active Leaderboards ▽

Virtuix Leaderboards

New Leaderboard ⊕

| Leaderboard Name | Game Name | Game Mode / Level | Time Type | Time Range | Actions | | |
|---|---|---|---|---|---|---|---|
| Daily Core Defense Contest | Omni Arena | Core Defense Easy (2-player) | Daily (Recurring) | 5/22/2018 - 5/29/2018 | View | Archive | Delete |
| Custom Core Defense Leaderboard | Omni Arena | Core Defense Easy (4-player) | Custom | 5/23/2018 5:00 AM - 5/23/2018 11:59 PM | View | Archive | Delete |
| Weekly Core Defense Contest | Omni Arena | Core Defense Hard (4-player) | Weekly (Recurring) | 5/20/2018 - 6/20/2018 | View | Archive | Delete |
| All-Time Training Ops Gauntlet Contest | Training Ops | Gauntlet | All-Time | ----- | View | Archive | Delete |

FIG. 4J

| Pattern | Every 1 Day | | |
|---|---|---|---|
| Recurrence Range | 5/22/2018 - 5/29/2018 | | |

Archive
Delete

| | | | |
|---|---|---|---|
| 6 | Logan35 / dAllan64 | | 12,314 |
| 7 | dAllan64 / dShuffield32 | | 12,054 |
| 8 | dShuffield32 / pRamesh23 | | 11,654 |
| 9 | sRutledge91 / cmsjayfer09 | | 11,235 |
| 10 | Lbrothers3 / BenDrakes | | 10,926 |

Previous  1  2  3  4  Next

FIG. 4K

OMNIVERSE

Competition Admin

ADMIN MENU
- Content Admin
- Usage Data Statistics
- Location Admin
- Player Accounts Admin
- Competition Admin
- Leaderboard Manager
- Tournament Manager
- Live Feed Admin

Leaderboard Manager

Show: [ Active Leaderboards ▽ ]

*Virtuix Leaderboards*

[ New Leaderboard ]

| Leaderboard Name | Game Name | Game Mode / Level | Time Type | Time Range | Actions | | |
|---|---|---|---|---|---|---|---|
| Daily Core Defense Contest | Omni Arena | Core Defense Easy (2-player) | Daily (Recurring) | 5/22/2018 - 5/29/2018 | View | Archive | Delete |
| Custom Core Defense Leaderboard | Omni Arena | Core Defense Easy (4-player) | Custom | 5/23/2018 5:00 AM - 5/23/2018 11:59 PM | View | Archive | Delete |
| Weekly Core Defense Contest | Omni Arena | Core Defense Hard (4-player) | Weekly (Recurring) | 5/20/2018 - 6/20/2018 | View | Archive | Delete |
| All-Time Training Ops Gauntlet Contest | Training Ops | Gauntlet | All-Time | ------ | View | Archive | Delete |

FIG. 4L

ADMIN MENU
- Content Admin
- Usage Data Statistics
- Location Admin
- Player Accounts Admin
- Competition Admin
- Leaderboard Manager
- Tournament Manager

Leaderboard Manager

Show: [ Active Leaderboards ▽ ]

*Virtuix Leaderboards*

[ New Leaderboard ]

| Leaderboard Name | Game Name | Game Mode / Level | Time Type | Time Range | Actions | | |
|---|---|---|---|---|---|---|---|
| Daily Core Defense Contest | Omni Arena | Core Defense Easy (2-player) | Daily (Recurring) | 5/22/2018 - 5/29/2018 | View | Archive | Delete |
| Custom Core Defense Leaderboard | Omni Arena | Core Defense Easy (4-player) | Custom | 5/23/2018 5:00 AM - 5/23/2018 11:59 PM | View | Archive | Delete |
| Weekly Core Defense Contest | Omni Arena | Core Defense Hard (4-player) | Weekly (Recurring) | 5/20/2018 - 6/20/2018 | View | Archive | Delete |
| All-Time Training Ops Gauntlet Contest | Training Ops | Gauntlet | All-Time | ------ | View | Archive | Delete |

FIG. 4P

OMNIVERS

ADMIN MENU
Content Admin
Usage Data Statistics
Location Admin
Player Accounts Admin
Competition Admin
Live Feed Admin Virtuix Omni New

| | Actions |
|---|---|
| Edit | Delete |
| Edit | Delete |
| Edit | Delete |
| Edit | Delete |

New Live Feed Object

Video ▽
Object Type

Halloween Advertisement Image
Image Title

5
Display Time (seconds)

Active ▽
Active/Inactive

Upload Image
(1920x1080)

▽ ☐ Global
  ▽ ☒ North America
    ▽ ☒ United States
      ☒ Omniverse VR
      ☒ Pinballz Austin
    ▽ ☐ Canada
    ▽ ☐ Mexico
  ▽ ☒ Europe
  ▽ ☐ Asia
  ▽ ☐ South America
Display Location Cancel     Save

FIG. 4Q

OMNIVERSE

ADMIN MENU
- Content Admin
- Usage Data Statistics
- Location Admin
- Player Accounts Admin
- Competition Admin
- Live Feed Admin

Live Feed Admin

*Virtuix Omni*

Welcome to the Live Feed Admin (Global)!
This tool will change what is visible on the live feed for all locations. Only the system admin has the ability to change the live feed for all locations. Locations will be able to access their live feed at http://livefeed.omniverse.global/.

New

Live Feed

| Order | Title | Display Time (sec) | Active / Inactive | Location | Actions | | |
|---|---|---|---|---|---|---|---|
| 1 | Virtuix Core Defense Contest | 15 | Active | Custom | ▷ ◁ | Edit | Delete |
| 2 | Halloween Advertisement | 5 | Active | Global | ▷ ◁ | Edit | Delete |
| 3 | Omni Advertisement Video 1 | 20 | Active | Global | ▷ ◁ | Edit | Delete |
| 4 | Virtuix Training Ops Contest | 15 | Inactive | Custom | ▷ ◁ | Edit | Delete |

FIG. 4R

OMNIVERSE

ADMIN MENU
- Content Admin
- Usage Data Statistics
- Location Admin
- Player Accounts Admin
- Competition Admin
- Live Feed Admin

Live Feed Admin

*Virtuix Omni*

Welcome to the Live Feed Admin (Global)!
This tool will change what is visible on the live feed for all locations. Only the system admin has the ability to change the live feed for all locations. Locations will be able to access their live feed at http://livefeed.omniverse.global/.

New

Live Feed

| Order | Title | Display Time (sec) | Active / Inactive | Location | Actions | | |
|---|---|---|---|---|---|---|---|
| 1 | Virtuix Core Defense Contest | 15 | Active | Custom | ▷ ◁ | Edit | Delete |
| 2 | Halloween Advertisement | 5 | Active | Global | ▷ ◁ | Edit | Delete |
| 3 | Omni Advertisement Video 1 | 20 | Active | Global | ▷ ◁ | Edit | Delete |
| 4 | Virtuix Training Ops Contest | 15 | Inactive | Custom | ▷ ◁ | Edit | Delete |

DATA MANAGEMENT AND PERFORMANCE TRACKING SYSTEM FOR WALKABLE OR INTERACTIVE VIRTUAL REALITY

CROSS-REFERENCE TO RELATED APPLICATIONS

This application is a national stage application of International Application No. PCT/US2019/054164, which was filed on Oct. 1, 2019, which claims priority to U.S. Provisional Application No. 62/739,676 filed on Oct. 1, 2018, of which is incorporated by reference in its entirety.

FIELD OF TECHNOLOGY

The present disclosure relates generally to an omnidirectional locomotion system and apparatus that can be used to provide a virtual reality system, and more specifically relates to systems and methods for providing an integrated and automated performance tracking platform.

BACKGROUND

Virtual reality systems are becoming increasingly popular, offering users an immersive experience that is often accompanied by a 360-degree field of view. This 360-degree field of view can be filled with real-world content such as video or image data that has been captured by one or more cameras, or the 360-degree field of view can be filled with computer-generated content such as animations and other renderings. In some cases, such real-world and/or computer-generated content can be utilized to implement a game or other interactive experience for one or more users of a given virtual reality system. However, these games are often standalone experiences that are unable integrate with the virtual reality system as a whole or measure and track various user and system performance parameters.

BRIEF DESCRIPTION OF THE DRAWINGS

In order to describe the manner in which the features of the disclosure can be obtained, a more particular description of the principles briefly described above will be rendered by reference to specific examples thereof which are illustrated in the appended drawings. Understanding that these drawings depict only example embodiments of the disclosure and are not therefore to be considered to be limiting of its scope, the principles herein are described and explained with additional specificity and detail through the use of the accompanying drawings in which:

FIGS. 3A-H illustrate example achievements according to an aspect of the present disclosure;

DETAILED DESCRIPTION

Figure 1:
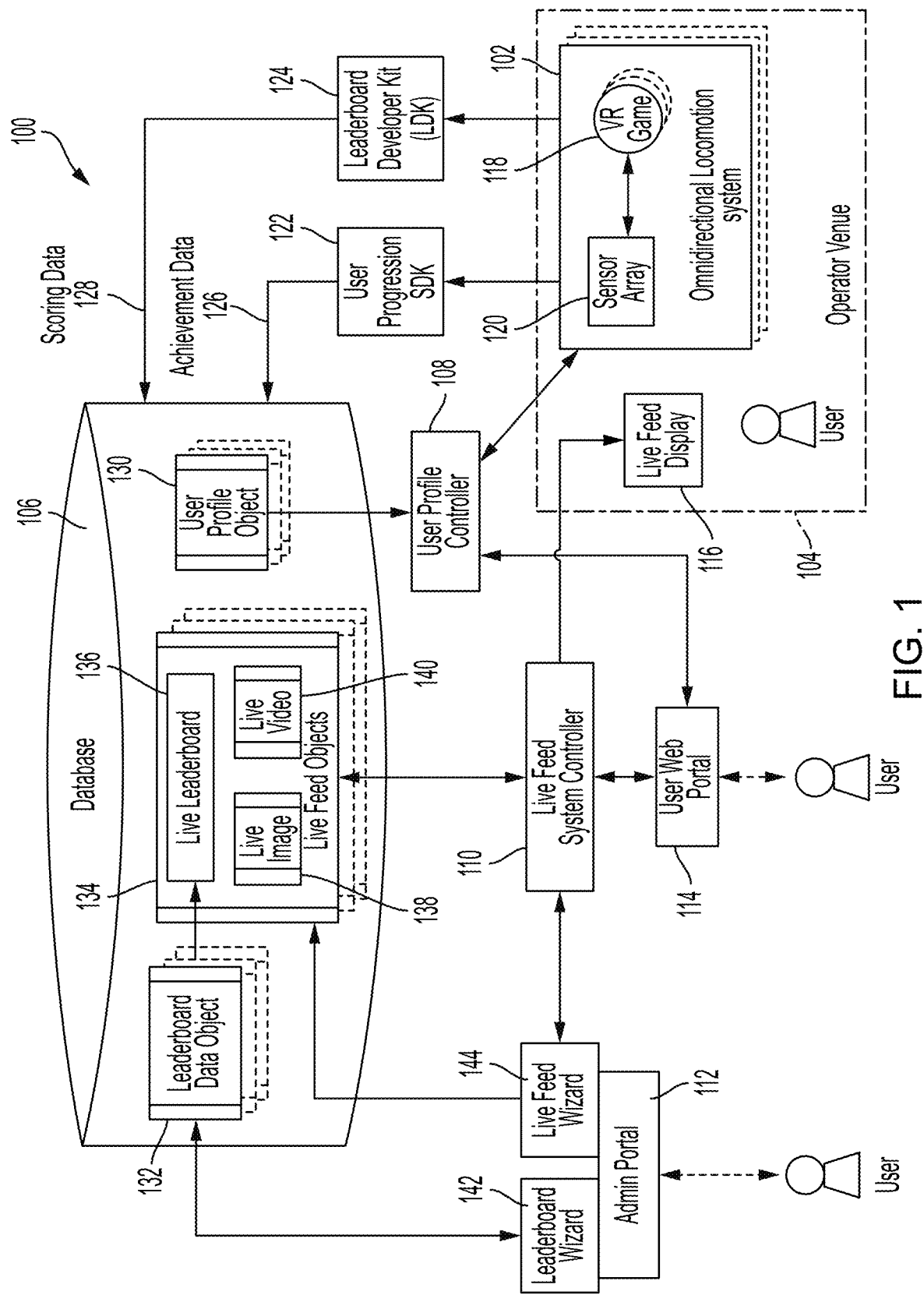
FIG. 1 depicts an example data management and performance tracking system according to an aspect of the present disclosure.

Disclosed herein are systems and methods for data management and performance tracking for a virtual reality environment or platform. In some embodiments, the virtual reality environment and platform can be provided by an omnidirectional locomotion system and/or an omnidirectional treadmill, for example as disclosed in U.S. Pat. No. 9,329,681.

Current virtual reality (VR) systems and platforms are capable of providing one or more virtual reality games or virtual reality experiences for a user (also referred to herein as a "player") to select and play. Various different ones of these VR games and VR experiences (also referred to herein as "VR content") can be designed, published, or otherwise made available by game studios and other content creating entities and individuals. However, while all of this VR content is compatible with a given virtual reality system or platform, there is oftentimes little in the way of continuity or direct connection between the different pieces of VR content—each piece exists in isolation and is interacted with by a user in isolation. Additionally, a user's interactions with such VR content tend to be fleeting in nature, meaning that no history or log is saved indicative of the user's interactions, that a user never desires to replay a VR game or repeat an interaction with a VR experience, or both.

Accordingly, it would be desirable to address these limitations of current VR content and provide an integrated and automated solution to track user performance and interaction across games and interactive experiences provided on a virtual reality system.

Disclosed are system, methods and non-transitory computer readable mediums for performance tracking, which can include an omnidirectional locomotion system (configured with one or more virtual reality games, omnidirectional treadmill and a sensor array), a leaderboard development interface; and a leaderboard creation GUI configured to create a leaderboard GUI. In some instances, the sensor array is attached to a user within the omnidirectional treadmill. In other instances, the sensor array is located on or within the omnidirectional treadmill.

Further disclosed in the system, methods and non-transitory computer readable mediums is a user progression interface coupled between the sensor array and a central database, the user progression interface ingesting sensor data from the sensor array and transmitting achievement data to the database.

Further disclosed in the system, methods and non-transitory computer readable mediums is that the achievement data can be used to determine an achievement level of a plurality of achievement levels of a user, the achievement level stored to a user profile. In some instances, each achievement level of the plurality of achievement levels has a threshold level, and the achievement level is determined when the achievement data exceeds or is equal to the threshold level.

Further disclosed in the system, methods and non-transitory computer readable mediums is that the leaderboard development interface is coupled between the one or more virtual reality games and a database, the leaderboard development interface ingesting in-game data from a given one of the virtual reality games and transmitting scoring data to the database.

Further disclosed in the system, methods and non-transitory computer readable mediums is a live feed system controller communicatively coupled between the database and the live feed creation GUI, wherein the live feed system controller transmits one or more of the live feed objects for display to one or more users of the omnidirectional locomotion system and updates one or more of the live feed data objects as new scoring data and achievement data are received at the database. In some instances, the leaderboard creation GUI is configured to receive one or more inputs defining parameters of a leaderboard data object and configured to receive one or more inputs defining a set of filters for populating the leaderboard data object with data from a database.

Further disclosed in the system, methods and non-transitory computer readable mediums is a live feed creation GUI configured to receive one or more inputs defining parameters of a live feed data object, wherein newly created live feed data objects are stored in a database.

Figure 2:
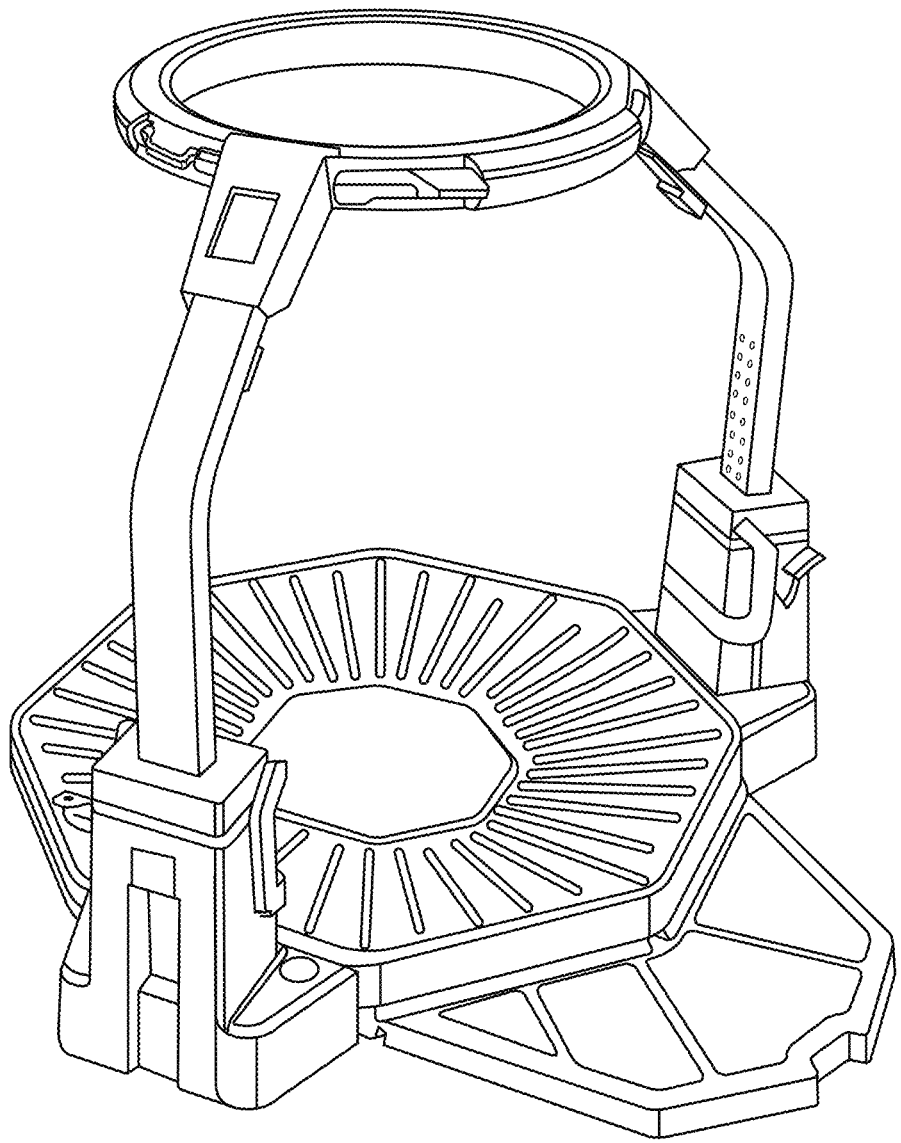
FIG. 2 depicts an example omnidirectional treadmill according to an aspect of the present disclosure.

FIG. 1 depicts an example diagram of a data management and performance tracking system 100 according to one or more aspects of the present disclosure. As illustrated, the data management and performance tracking system 100 includes a plurality of Omnidirectional Locomotion Systems 102 (e.g. omnidirectional treadmills, shown in FIG. 2) which are deployed and operated at given Operator Venues 104; a Database 106; a User Profile Controller 110; a Live Feed System Controller 110; an Admin Portal; a User Web Portal 112; and a Live Feed Display 116, each of which are explained in greater depth below. The below explanation of the various components, interactions and transmissions, while described in a system example are not limited as such. For example, the various components, interactions and transmissions can be carried out in one or more methods or non-transitory computer readable mediums.

Each Omnidirectional Locomotion System 102 is provided with a plurality of VR games 118 (or other VR content and VR experiences) for a user to play. The Sensor Array 120 can serve as input to the VR games 118. The Omnidirectional Locomotion Systems 102 are depicted as being located at an Operator Venue 104 (e.g. an arcade, etc.), although the present disclosure applies equally to a private omnidirectional locomotion system (e.g., player's house, etc.). Similarly, the Omnidirectional Locomotion Systems 102 are shown as being communicatively coupled to a User Profile Controller 108 for purposes of enabling a user to login and load their personal user profile on a desired omnidirectional locomotion system prior to its use, although the present disclosure also applies to those users who do not opt to login to the omnidirectional locomotion system.

As the user plays a VR game 118 or interacts with other VR content on the omnidirectional locomotion system, the presently disclosed data management and performance tracking system ingests (into one or more Databases 106) data from both the omnidirectional locomotion system itself (e.g. from a Sensor Array 102 of an omnidirectional treadmill) and further ingests data from within the VR game 118 or other VR content being provided to the user of the omnidirectional treadmill. As shown, only a single database is provided, although it is appreciated that various other database configurations and layouts can be utilized. In some instances, one or more databases can be provided in a distributed or cloud fashion.

For the purposes of this data ingestion, a User Progression Software Development Kit 122 (SDK) and a Leaderboard Development Kit 124 (LDK) are utilized to implement one or more data interfaces (e.g., user progression interface, leaderboard development interface, etc.) between the Omnidirectional Locomotion System 102 and the Database 106. As illustrated, the User Progression SDK 122 communicates with the Sensor Array 120 of the omnidirectional locomotion system and transmits Achievement Data 126 to the Database 106, while the LDK 124 communicates with the VR game 118 (or other VR content) running on the omnidirectional locomotion system and transmits Scoring Data 128 to the Database 106. It is contemplated that in some embodiments, one or more of the Achievement Data 126 and the Scoring Data 128 may be substantially unprocessed and transmitted to the Database 106 in raw form. In some embodiments, these separate data streams can be correlated or otherwise pre-processed by one or more of the User Progression SDK 122 and the LDK 124 before being transmitted to Database 106 for storage and further use. In other examples, the Achievement Data 126 and the Scoring Data 128 can be transmitted and processed at the Database 106 (e.g., via connected device, database controller, etc.), that is without the use of the User Progression SDK 122 and the LDK 124.

Achievement Data 126 represent physical interactions between the user and the Omnidirectional Locomotion System 102, independent of any VR game 118 (or other VR content) that is being presented to the user. This Achievement Data 126 can be used to automatically track, calculate, and generate system achievements corresponding to a given user's usage of the omnidirectional locomotion system. For example, Achievement Data 126 can include data representing the number of overall steps that the user has taken on the Omnidirectional Locomotion System 102, the number of calories the user has burned, the amount of time the user has spent on the Omnidirectional Locomotion System 102, the number of sessions the user has played, etc.

This Achievement Data 126 is derived, at least in part, from the output of the Sensor Array 120 of the Omnidirectional Locomotion System 102. This sensor array may be integrated with the omnidirectional locomotion system, or may be provided separately for the purposes of providing sensor data to the presently disclosed data management and performance tracking system. In some embodiments, the sensor array can include, but is not limited to, one or more of the following: inertial measurement units (IMUs), capacitance sensors, ambient light sensors, magnetic tracking sensors, acoustic sensors, pressure sensors, optical tracking sensors, Hall Effect sensors, infrared sensors, a VR headset sensor sub-array, a VR base station sensor sub-array, a torso/hip orientation sensor, a hand controller sensor sub-array, etc. One or more of the sensors of the sensor array can be removably attached to the user of the omnidirectional locomotion system, can be integrated into an accessory item provided to the user, etc. in some embodiments, one or more of the sensors of the sensor array can stream raw measurement data to an aggregator board.

Once collected, the sensor data can be transformed into Achievement Data 126 by the User Progression SDK 122, which analyzes the various streams of sensor data from different sensors of the overall sensor array in order to calculate an interaction history or sequence of movements corresponding to the user of the Omnidirectional Locomotion System 102.

From the Achievement Data 126, various different user achievements can be awarded to the user, or the user's progress towards accomplishing various achievements can be updated, for example, saved to the User Profile Object or some other location within the Database 106. Each achievement can be associated with a number of different levels, each having a different threshold. FIG. 3A depicts non-limiting example movement achievements that could be provided to a user of the omnidirectional locomotion system. The movement achievements can be awarded as players reach certain milestones with the number of steps they have taken. More milestones can be added to the system as players approach the upper milestones. The overall achievement is a movement achievement, and the different or constituent levels of the overall movement achievement are categorized with uniquely identifying names (e.g. "mobile", "sure-footed", "strider", etc.). Each one of these levels has a required threshold for its achievement (e.g. reach 100 steps, 500 steps, 1,000 steps), and grants some number of achievement points (abbreviated as "AP" in the table above).

As a user obtains achievements, their User Profile Object 130 in the Database 106 can be updated to reflect the fact that a given achievement has been accomplished. The User Profile Object 130 can also be updated with the achievement points (AP) that are granted by the given achievement. In some embodiments, an overall player achievement score can be calculated from the sum of achievement points that the user has earned, e.g. in the lifetime of their account, the prior year, the prior month, etc. Additionally, some achievements may grant a "player title" along with the achievement points, such that a user can select one of their earned player titles to be displayed underneath the user's profile name within the UI of the omnidirectional treadmill system.

Returning now to a discussion of the system-level achievements generated via the Achievement Data 126 and the User Progression SDK 122, the Sensor Array 120 can output the desired data or statistic directly to the User Progression SDK 122 (e.g. the output of the sensor array is an integer representing the number of steps taken), or the Sensor Array 120 can output raw data that the User Progression SDK 122 uses to calculate the desired data or statistic (e.g. the output of the sensor array is the signal generated by an accelerometer, which is analyzed by the User Progression SDK 122 in order to determine a step count).

In some embodiments, the Omnidirectional Locomotion System 102 communicates with the User Profile Controller 108 in order to correlate the generated Achievement Data 126 to a User Profile Object 130 that is stored in the Database 106 and corresponds uniquely to the current user of the Omnidirectional Locomotion System 102. In some embodiments, the generated Achievement Data 126 can be tied to a temporary session profile that exists only so long as the user's current session with the Omnidirectional Locomotion System 102 remains active.

Scoring Data 128 represents virtual or in-game interactions between the user and the VR game 118 (or VR content) that is being displayed on the Omnidirectional Locomotion System 102. Scoring Data 128 corresponds to user accomplishments and performance in the context of the virtual world of the VR content (e.g. the number of kills a user achieves in one round of a first-person shooter VR game, the lap times in a racing VR game, the completion time in a puzzle VR game, etc.). In certain instances, this Scoring Data 128 can be used to automatically track, calculate, and generate in-game achievements in a similar manner as described above with respect to the use of Achievement Data 126 to generate system achievements.

The Leaderboard Development Kit (LDK) 124 is utilized to enable developers or VR content creators to implement leaderboard functionality within their VR games or content. In order to do so, the VR game must communicate with the database and overall data management and performance tracking system of the present disclosure. This communication is represented in, for example, FIG. 1 by the LDK 124 interposed between the VR game and the database. In some examples, the LDK 124 can transmit Scoring Data 128, from the VR games 118, to Database 106. This Scoring Data 128 can be used for an online leaderboard (e.g., Live Leaderboard 136, etc.).

In general, the LDK 124 can define a consistent framework across all VR games that will be played on the omnidirectional treadmill such that the various achievements and achievement points (APs) earned within different games can be combined into the overall player achievement score described above. For example, each game can be assigned a fixed allotment of achievement points to be distributed as desired across the desired achievements that are to be implemented by the VR game developer, e.g. each game might be capped at no more than 1,000 total achievement points to be awarded to the user, regardless of how few or how many different achievements that VR game developer decides to implement.

Broadly, in-game achievements derived from the Scoring Data 128 and the LDK 124 can be divided into three different categories: those that award the first-time experience, those that award the completion of objectives, and those that award the completion of challenges.

FIG. 3B depicts non-limiting examples of different first-time achievements within a given VR game. FIG. 3B illustrates four separate first-time achievements, each worth 25 Achievement Points (APs), rather than four levels of the same first-time achievement. By its nature, a first-time achievement can only be achieved once, and is generally not compatible with a level-based progression system as is found in other achievements described herein.

Achievements that award the completion of objectives, also referred to as "objective achievements", are awarded in response to the user completing different in-game objectives. Progress towards or completion of these in-game objectives can be tracked by the LDK 124, rather than the data management and performance tracking system of the present disclosure, thereby removing the immense computational overhead that would be required in order to perform all calculations in the performance tracking system. FIG. 3C depicts non-limiting examples of different objective achievements for the same VR game used in the example above. The achievements are not all different levels of a single over-arching achievement, although there are some example of paired or leveled achievements, such as "Core Defense Gold", "Core Defense Platinum", and "Core Defense Master".

A third category of achievements derived from the Scoring Data 128 ingested to the Database 106 via the LDK 124 consists of challenge achievements, which are awarded to players upon the successful completion of a challenge or other difficult/infrequent in-game feature. These challenge achievements therefore reward players who excel at a given VR game and perform well, thereby providing the players with a reason to return to the game and play again when they otherwise would not have. FIG. 3D depicts non-limiting examples of different challenge achievements for the same VR game used in the two examples above. Further examples and details of scoring data and in-game achievements are shown in FIG. 3E-2H.

Returning now to the discussion of FIG. 1, the aforementioned achievements can be transmitted from the User Profile Controller 108 to the omnidirectional locomotion system for presentation to the user. For example, the user achievements (and other user profile information) can be presented to the user in the context of a virtual reality menu or home screen environment of the omnidirectional locomotion system. Additionally, the user profile controller can transmit user achievements and other user profile information to a User Web Portal 114, which allows a user to login using a computing device of his or her choosing.

In addition to the achievement functionality discussed above, the data management and performance tracking system of FIG. 1 can additionally provide for a leaderboard functionality. This leaderboard functionality is provided by constructing a plurality of leaderboard data objects from the in-game scoring data that is already stored within the Database 106.

In general, an administrator uses a Leaderboard Wizard 142 or other helper GUI of an Admin Portal in order to create, view, archive, and delete leaderboard data objects. To create a leaderboard data object, the admin provides definition data for the leaderboard (e.g. title, description, competition type, etc.) and filter parameters that configure the specific scoring data that will be retrieved from the Database 106 and presented within the leaderboard. In some embodiments, the filter parameters can be pointers to specific data locations, types, streams, feeds, inputs etc. within the Database 106.

The leaderboard data object itself is not presented to the user however—it serves as an organizational and data management structure rather than a user-facing element. In order to serve leaderboards to users and other desired locations, the data management and performance tracking system of FIG. 1 includes a Live Feed System Controller 110 and a plurality of Live Feed Objects 134. These Live Feed Objects 134 include Live Leaderboards 136, Live Images 138, and Live Videos 140. For example, in order to present a leaderboard to a user (or provide it within the virtual reality environment of the Omnidirectional Locomotion System 102), a Leaderboard Data Object 132 is converted into a Live Leaderboard Object 136.

The Live Image 138 and Live Video objects 140 include largely the same parameters as the live leaderboard object, with the difference being that an image file (or pointer to an image file)/a video file or pointer to a video file is used instead of a leaderboard data object. In some embodiments, the image or video file that is used can be an advertisement. These advertisement files can be stored external to the data management and performance monitoring system of FIG. 1, can be stored in the depicted Database 106, or both.

The Leaderboard Data Object 132, can include, but is not limited to:

Leaderboard Title: this variable is the title of the Leaderboard. It can displayed in the backend as well as at the top of the Leaderboard on the showcase.

Subtitle: this variable provides a short and concise description of what the Leaderboard is displaying.

Description/Messaging: this variable is a short description that provides any additional information or messaging that needs to be communicated for the Leaderboard. This variable would communicate information such as the prize for the leaderboard, the time that it is ending, and how to enter the leaderboard (e.g., account required, etc.)

Competition Type: this variable represents the type of competition that is being run with this leaderboard. The admin can select between several different types of competition. Here are some examples of different competition types: "Friendly" competitions which means that there is no prize competition, "Prize Pool" competitions, which means that there is a prize pool that is distributed to multiple winners at the end, and "All-or-nothing" competitions, which means that 1st place in the competition gets the full prize.

Competition Type Option Value: this variable is an option value that provides additional information needed for a competition type. For example, if the competition type is "Prize Pool" then this value is the prize pool amount that is available for the winners of the leaderboard. The title for this value is tied to the competition type and is automatically visible when the competition type is chosen. For example, if the admin chooses the "Prize Pool" competition type, then the title for the competition type option title is automatically set to "Prize Pool Amount (USD)".

Display Tiebreaker Column: this Boolean variable signifies whether the leaderboard displays a column for the tiebreaker value. A tiebreaker column can be added to the leaderboard. If it is a short leaderboard and ties are unlikely, then the tiebreaker column can be hidden.

Leaderboard Filters: the data for the leaderboards can be stored in the database, so the data can be filtered in multiple ways depending on what is stored in the leaderboard data structure.

Game Title Filter: filters the data based on the title of the game. This is selectable from a game title table in the database that includes the games that can have leaderboards. The CPs (Content Providers) provide the title of their game in the leaderboard data. If leaderboard data is submitted with a new game title that does not exist in the database, the new game title should automatically be added to the list of games selectable in this field.

Game Mode/Level Filter: filters the data based on the specific game mode/level in the game. If a game has multiple leaderboards, this variable must be unique for each leaderboard. This filter is chosen from a Game Mode/Level table in the database that is specific for the selected game. There are different options in this field depending on the game title chosen in the previous field. If leaderboard data is submitted with a new game mode/level that does not exist in the database, the new game mode/level should automatically be added to the list of game modes/levels selectable in this field. In some instances, it should also only be visible if the corresponding game title is selected in the previous field.

Location Filter: filters the data based on the location that it was created. This field is a hierarchy tree where the admin can select Global/Regions/Countries/Operator Locations for the location of the data to be displayed. The list of countries and operator locations already exist in the database, but a new table for regions will need to be created in the database. Each region can contain a collection of countries that exist within the region.

User Type: filters the data based on the type of user that creates the data.

User Accounts Only: filter displays only the data that is created with an User Account. If a leaderboard is set to show only the scoring data for user accounts, then the leaderboards shall only display the top score for each user account. This is possible when the user accounts are required to have a unique name.

All-Users (User Accounts and Guests): this option does not filter out any data based on user type. All leaderboard scoring data, whether from user accounts or guests, is displayed on this leaderboard. Players without a user account do not have unique names so it is unknown whether players with the same name are the same person. Because of this, if a leaderboard is set to show "All-Users", the data will include multiple entries for duplicate names. Since players without accounts can have their name on a leaderboard multiple times, players with user accounts can also have their name multiple times on the leaderboards with players without user accounts.

At least one User Account (Team Play): this filter is useful for team leaderboards where each data entry has more than one player. This filter includes any teams that have at least one user account. So, if 2 players play a co-op leaderboard, and player 1 is signed into a user account, but player 2 is signed into a guest account, the leaderboard scoring data will be on the leaderboard. If both players are signed into a user account, then they will also be on the leaderboard. If both players are signed into guest accounts and not into an user account, then their score will not be on the leaderboard. With this option, the leaderboard does not display duplicate entries for teams that are made up of the same user accounts. If the team contains any players on with a guest name, then the score is displayed on the leaderboard, regardless of whether there is another entry with the same guest name.

Timing: filter the data based on the date and time that it was created. This field also enables the creation of recurring leaderboards.

Daily: this option creates a leaderboard that shows only the leaderboard scoring data for a specified day. There are also options available to create a recurring leaderboard so that a new leaderboard does not have to be created every day. The recurring leaderboard can be specified to run every day, or every x number of days.

Start Time (Time/Time Zone): this filter option specifies the time (including time zone) when the leaderboard begins. For recurring daily leaderboards, this time is the time, each day, that the new leaderboard begins. The leaderboard automatically ends 23 hours and 59 minutes after the start time.

Recurrence Pattern: every [x] Day(s). If this value is set to 1, then the leaderboard occurs every single day. If the value is set to 2, then it occurs every other day, and so on.

Recurrence Range: the recurrence range defines how many days the daily leaderboard is active.

Start Date: the start date is the date that the daily leaderboard becomes active. This allows the creation of leaderboards before the leaderboard competition has begun. The first leaderboard starts at the "Start Time" on the "Start Date"

End Date: the end date is the date that the daily leaderboard ends and becomes inactive. There are 3 options available to select an end date. 1). No End Date—this option means the leaderboard has no end date, and is set to be recurring forever, or until it is changed/deleted in the backend. 2). End after [x] occurrences—this option means the leaderboard ends after a specified number of occurrences. For example, the leaderboard can be set up to end after 10 occurrences. If it is a daily leaderboard that is happening every day, then it would end after 10 days. 3). End by [Date]—this option means the leaderboard ends on the specified date. The specified date is the last date to run this leaderboard Weekly: this option creates a leaderboard that shows the leaderboard scoring data for a specified week. There are also options available to create a recurring leaderboard so that a new leaderboard does not have to be created every week. The recurring leaderboard can be specified to run every week, or every x number of weeks.

Start Day and Time (Day/Time/Time Zone): this filter option specifies the day and time (including time zone) when the leaderboard begins. For example, Monday at 5:00 AM CST. For recurring weekly leaderboards, this day and time is the day and time, each week, that the new leaderboard begins. The leaderboard automatically ends 6 days, 23 hours and 59 minutes after the start time.

Recurrence Pattern: every [x] Week(s). If this value is set to 1, then the leaderboard occurs every single week. If the value is set to 2, then it occurs every other week, and so on.

Recurrence Range: the recurrence range defines how many days the daily leaderboard is active.

Start Date: the start date is the date that the weekly leaderboard becomes active. This allows the creation of leaderboards before the leaderboard competition has begun. The first leaderboard starts the first time that the "Start Day and Time" occurs on or after the "Start Date"

End Date: the end date is the date that the daily leaderboard ends and becomes inactive. There are 3 options available to select an end date. 1). No End Date—This option means the leaderboard has no end date, and is set to be recurring forever, or until it is changed/deleted in the backend. 2). End after [x] occurrences—This option means the leaderboard ends after a specified number of occurrences. For example, the leaderboard can be set up to end after 10 occurrences. If it is a weekly leaderboard that is happening every week, then it would end after 10 weeks. If it is happening every other week, then it would end after 20 weeks (still only 10 occurrences). 3). End by [Date]—This option means the leaderboard ends on the specified date. The end date does not end a leaderboard that is currently in progress, but it does not allow another leaderboard to start on or after the specified end date.

All-Time: this is a preset filter option that does not filter out any data based on time.

Custom Time: this option allows the operator to select a start time for the leaderboard and an end time for the leaderboard. Any data that is outside that range is filtered out. This field is defined by the date and time (Hour/Minute) and time zone for the start and end time.

The Live Leaderboard Object 136 fully includes the leaderboard data object (or a pointer to the leaderboard data object), and adds a display time (e.g. the number of seconds to display the leaderboard in the live feed before transitioning to the next queued element in the live feed, if there is one), an active/inactive tag, and a display location.

Database 106 can also include a scoring data structure (for example, formatted Scoring Data 128). The scoring data structure can include, but is not limited to:

Game Title: this variable is the title of the game.

Game Mode/Level: this variable is used to distinguish between multiple leaderboards that exist for one game. If a game has multiple leaderboards, this variable must be unique for each leaderboard.

Player ID #: this variable is a unique ID # generated for the players in this session. This ID # is linked to another table that has player information tied to the ID #. This allows the leaderboard to have multiple players tied to one score for the coop leaderboards. For example, if the Player ID # is 100176, then the database looks at the linked Players table and retrieves all players that have the ID #100176. There is just one player with that ID # in the Players table if the leaderboard is only single player, but there are multiple players with that ID # if it is a coop leaderboard. If the player is using a user account, then the player name is retrieved from the user data stored in Database 106. If the player is using a guest account, and a custom name has been entered, then the custom name is used for the player name (this name is not a unique name and may have duplicates). If the player is using a guest account and does not have a custom name, then an auto-generated username (i.e. Player-156) is used in the leaderboard.

Team Name: this variable is the Team Name that is used for co-op leaderboards. If the players enter a Team Name in the system before playing a coop leaderboard, then this value is displayed on the leaderboard instead of the player usernames.

Score: this variable is an integer value that is displayed by the player's name on the leaderboard. This value determines the order of the names on the leaderboard. The score variable is unique to each game and is not comparable to the scores of other games. The CP translates game statistics, such as kills, successful objectives, etc., into one integer value that represents score. For example, Core Defense creates a score based on the number of kills (1000 points per kill) and the remaining health of the power core at the end of each wave (0-10000 remaining health).

Tiebreaker Title: this variable is the title of the value that determines which player wins in a tie scenario. The tiebreaker value can be displayed in a separate column in the leaderboard. The tiebreaker title is used as the title for the column in the leaderboard. This title communicates to the players why they are lower on the leaderboard than another player with the same score. For example, in Core Defense, this title could be "Performance Rating", so that players know that even though they have the same score, the other player had a better performance.

Tiebreaker Value: this variable is that value that is used to determine which player wins in a tie scenario. The tiebreaker value can automatically set to sort in descending value, meaning that if two players are tied, the player with the higher tiebreaker value is ranked higher on the leaderboard. For example, in Core Defense, the CP can add a tiebreaker value to the data that is based on number of kills, accuracy, number of deaths and distance traveled in the game so that even if players have the same score, the player who performed better is higher on the leaderboard. If the CP decides not to use this value, the leaderboard automatically sorts the data based on the date and time that it was created. In a tie, the data that was created first is higher on the leaderboard.

Device Info: this variable includes the Device Info from the SDK. This includes Shop ID, Shop Name, Region, etc. This variable is used for location information for the device.

Date/Time: this variable is the date and time that the data was created. This date and time must be taken from the server to prevent cheaters who may change the system time on their computers.

Ascending/Descending Score Sorting: this variable specifies whether the score data is sorted with the highest values first or the lowest values first. This value is provided by the CP, as they decide if the highest or lowest value wins in their scoring system.

Leaderboard Version Number: this variable determines the version of the data. This is important in case the scoring in a game is updated, making the previous scores incompatible and invalid. This value is provided by the CP and will be changed whenever the CP makes a change to the scoring system in their game.

Session ID: this variable is a unique identification number for the session in which this leaderboard data was created. This enables identification needed to display this data in the tablets when the session is over.

Turning back to FIG. 1, the Admin Portal 112 includes a Live Feed Wizard 114 or other configuration UI in order to assist an administrator in creating, viewing, editing, archiving, and deleting live feed objects. In the process of creating a live feed object, an administrator can use the Live Feed Wizard 144 to define the parameters of the live feed objects as discussed above. The Live Feed Wizard 144 can also be used to upload images and videos to be displayed, to manage the queue of live feed objects to be displayed, to manage current live feeds being displayed, etc.

In other words, the Live Feed Wizard 144 is used to receive input defining desired changes or behavior of the overall live feed system. In order to actually implement these desired changes, the Live Feed Wizard 144 communicates with a Live Feed System Controller 110, which is responsible for pulling live feed objects from the Database 106 and transmitting them to various locations for actual display or presentation. For example, the Live Feed System Controller 110 might transmit a live leaderboard object (which is updated based on the most current Scoring Data 128 ingested into the Database 106 via the LDK 124) to the user web portal, where it is presented in response to a user query.

In some examples, the Live Feed System Controller 110 can transmit a live leaderboard object to a live feed display that is located in the same operator venue as the omnidirectional locomotion system. This live feed display may be a standalone display unit or can be integrated with the hardware of the omnidirectional locomotion system itself. In some instances, particularly when the live feed display is located within the operator venue, it can be desirable to configure the live feed display as a passive device, i.e. capable only of displaying the live feed, not accepting inputs or modifications to the live feed. In this manner, users or other patrons at the operator venue will not be able to tamper with or otherwise interfere with the desired display of the live feed as configured in the Live Feed Wizard 144 of the Admin Portal 112.

In other scenarios, the live feed display may be provided with limited input functionality, e.g. a user or patron at the operator venue may be able to browse or scroll through a display of different leaderboards, or may be able to select a particular live feed to watch (similar to the manner in which one selects a television channel to watch), but the user or patron is unable to provide inputs beyond those to query or navigate through the available live feed elements.

Similarly, it is contemplated that the live feed and/or live feed objects presented in the User Web Portal 114 will be similarly resistant to tampering or other user modification of any definition parameters of either the live feed or the live feed objects, as this functionality is limited to the Admin Portal 112 and the Live Feed Wizard 114.

Multiple live feeds and/or live feed objects may be displayed simultaneously, e.g. in a split-screen or other divided screen arrangement. In some embodiments, the Live Feed System Controller 110 can push updates to all active live feeds as soon as the updated data is available, e.g. the live feeds are updated in substantially real-time. In some embodiments, the Live Feed System Controller 110 can transmit updated data to the live feed objects at some fixed, periodic, and/or pre-configured interval. For example, updates might be collected and compiled at the Database 106 or Live Feed System Controller 110 for a period of one minute, at which time the consolidated update package is then broadcast by the Live Feed System Controller 110 to the live feed objects. It is contemplated that the Live Feed System Controller 110 may update all live feed objects simultaneously, e.g., in a broadcast fashion, or that the Live Feed System Controller 110 may update live feed objects with a frequency that is defined during the creation of the live feed object.

Figure 4C:
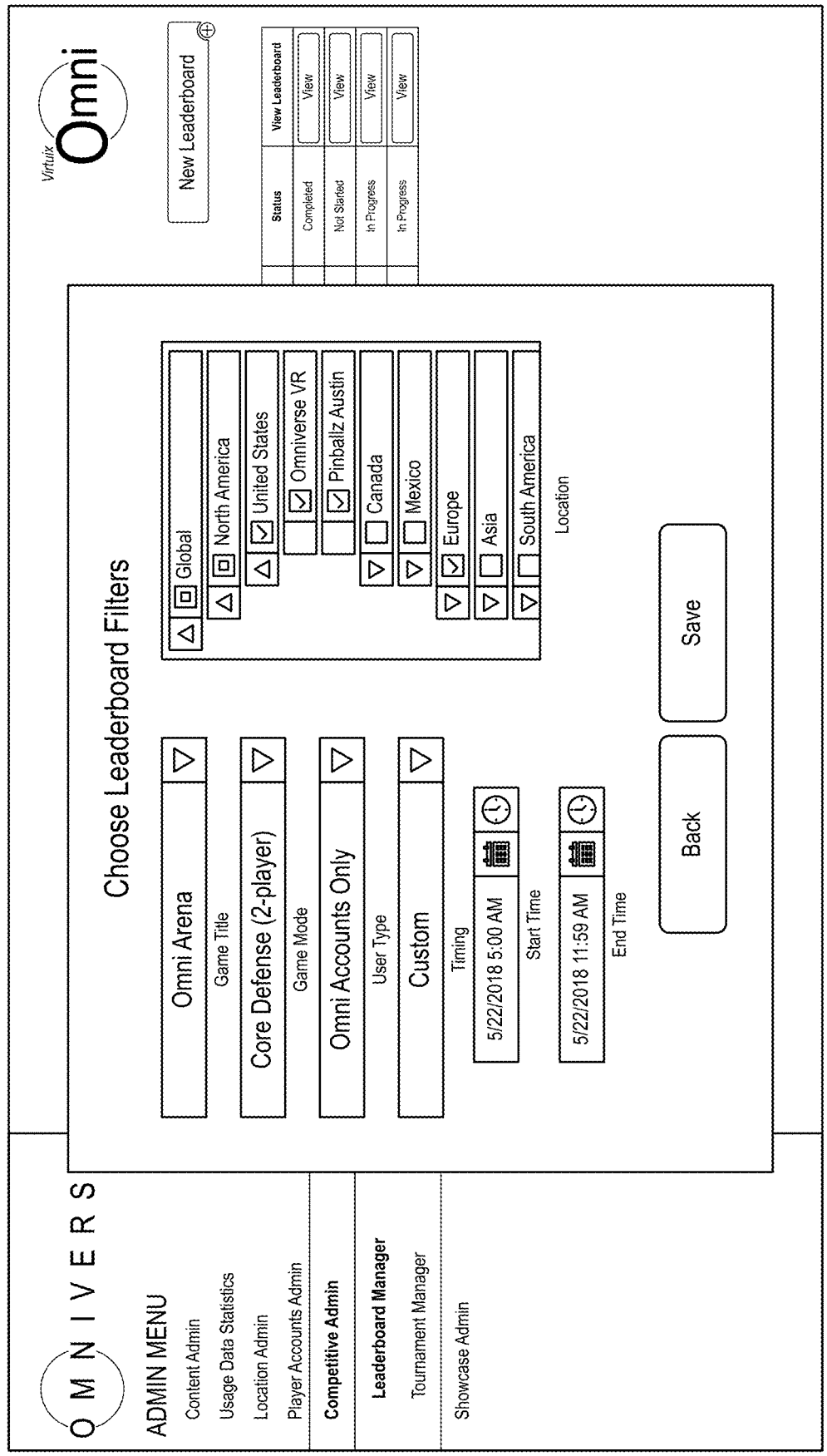
FIGS. 4A-R illustrate example graphical interfaces according to an aspect of the present disclosure.
Figure 4M:
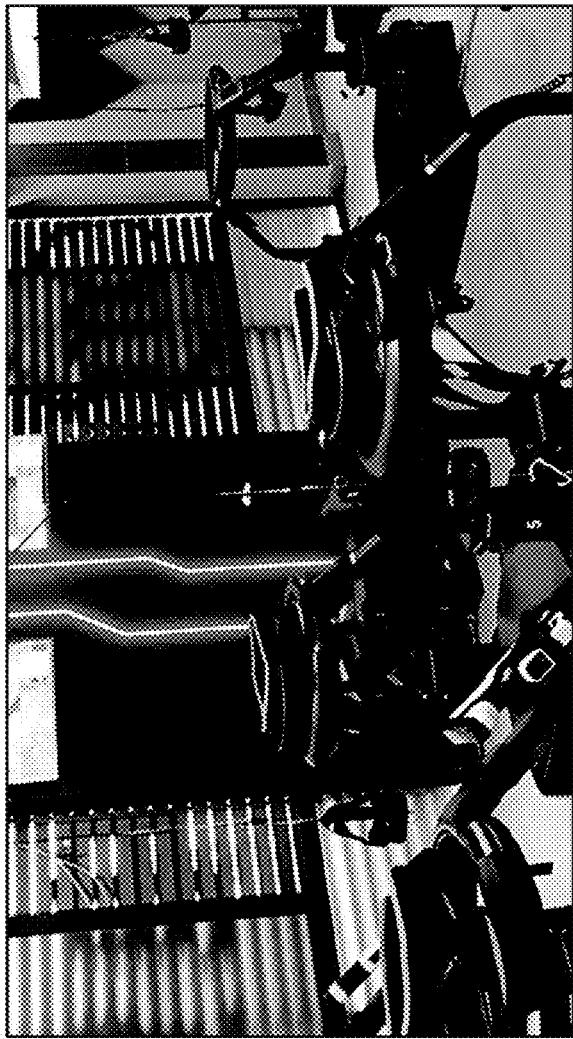

FIGS. 4A-4R illustrates example graphical interfaces of the Leaderboard 136, Admin Portal 112, Leaderboard Wizard 142 and associated components described in FIG. 1.

FIGS. 4A-B illustrates example leaderboard wizards. The leaderboard wizards can be for the system admin (only accessible by administrators). The leaderboard wizard can enable system admins to create, view, filter, archive, and delete leaderboards. For example, creating a new leaderboard object can include some of the following information from an administrator: leaderboard title, subtitle, description/messaging, competition type, competition type option value, display tiebreaker column, etc. The administrator can also choose one or more filters to determine what data is displayed on the leaderboard. The wizard can also display for "view" the current leaderboards and associated data for selected leaderboards, as shown in FIGS. 4D-F. The wizard can also display data relating to user accounts and ranks, as shown in FIGS. 4G-H. The wizard can also archive leaderboards, as shown in FIGS. 4I-K. Archiving leaderboards is used when a leaderboard is completed, but the history of the leaderboard is going to be maintained in case it needs to be viewed in the future. The wizard can also delete leaderboards, as shown in FIG. L. Deleting leaderboards is used for instances where mistakes are made in the leaderboard manager. Any leaderboards that have been successfully run and completed are archived. If while creating a leaderboard, the admin makes a mistake, they can delete the leaderboard and make a new one. The admin can delete a leaderboard by clicking the "Delete" button next to a leaderboard on the table in the leaderboard manager. If the admin clicks the "Delete" button, a dialog box appears that asks if the admin is sure that they want to delete a leaderboard. If the admin clicks yes, then the leaderboard is deleted from the leaderboard manager. FIG. M illustrates an example leaderboard.

Figure 4N:
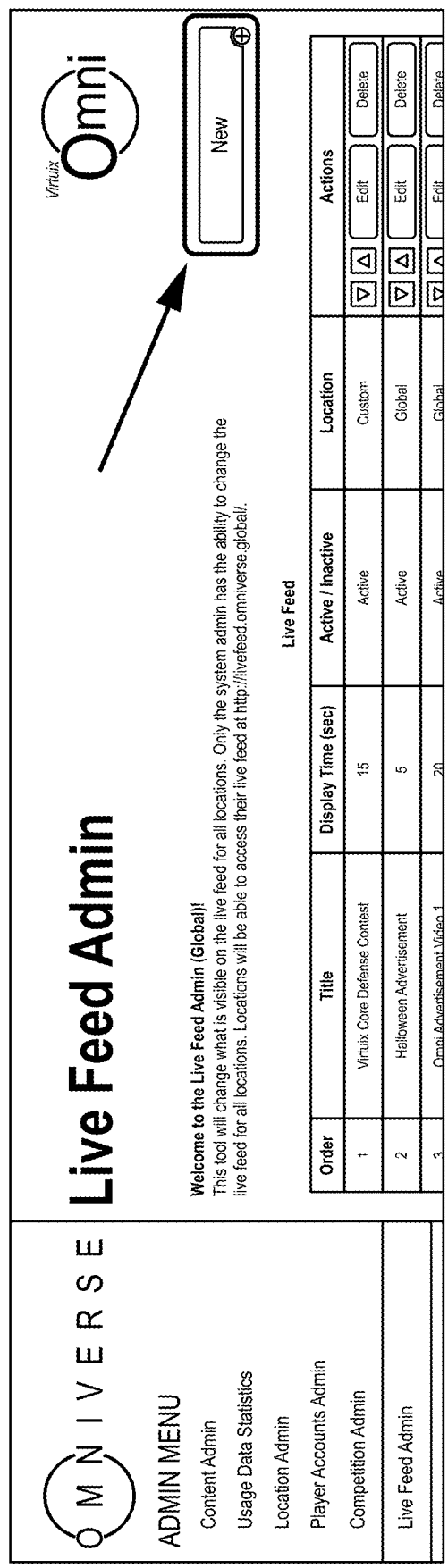
Figure 40:
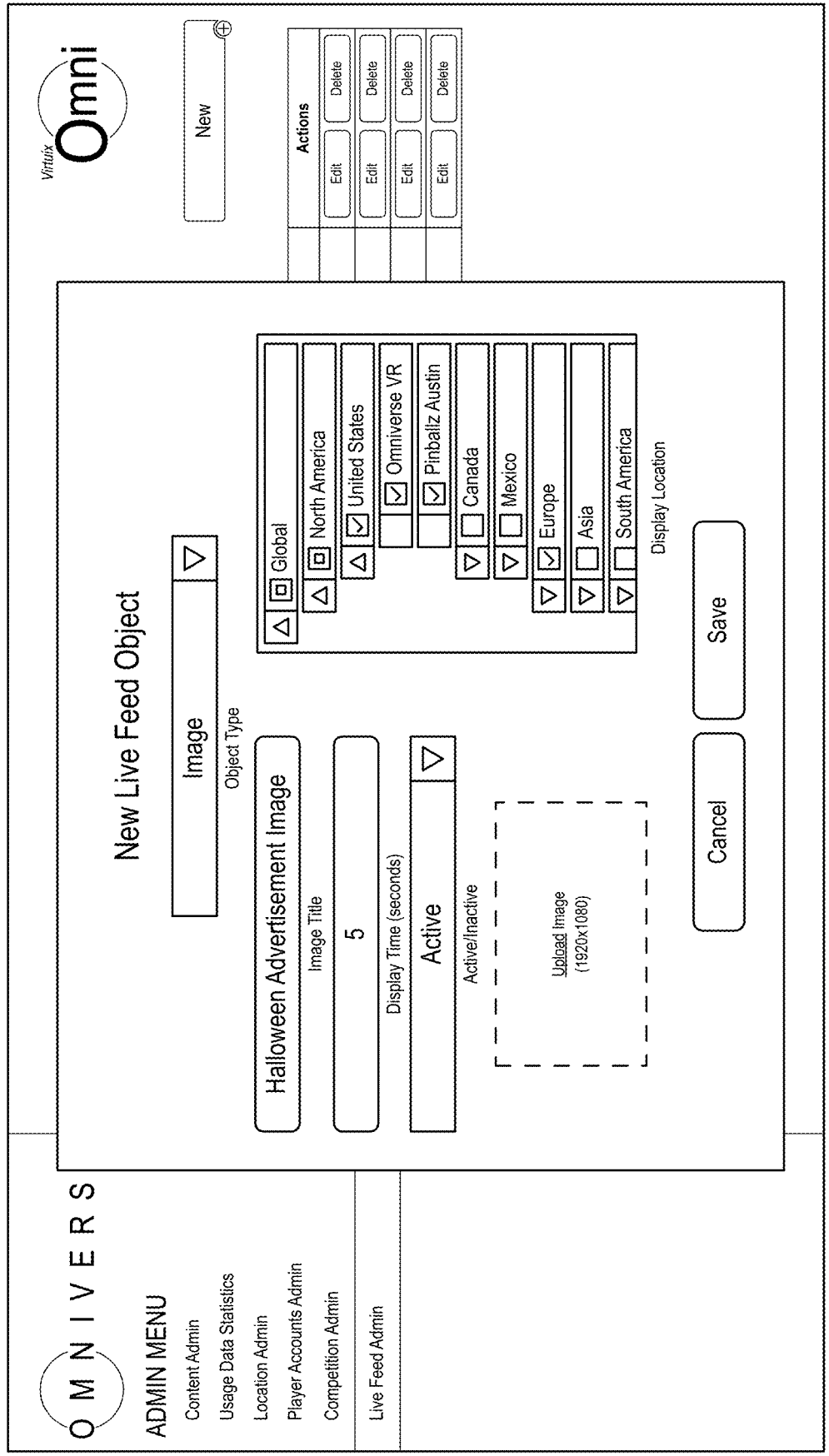

FIG. 4N-R illustrate example Live Feed Wizard 144. The system admin can create new live feed objects through the Live Feed Wizard 144 as shown in FIG. 4N. When creating an image live feed object (shown in FIG. 4O), the admin fills in fields for "Image Title", "Display Time (seconds)", and "Active/Inactive". The admin then uploads the image to be displayed in the live feed. The last step is to select the location for this object to be displayed. This field is a hierarchy tree where the admin can select Global/Regions/Countries/Operator Locations for these objects to be displayed. After all fields are populated, the admin clicks the save button to finish creating the object. When creating a video live feed object (as shown in FIG. 4P), the admin fills in fields for "Video Title", "Display Time (seconds)", and "Active/Inactive". The admin then uploads the video to be displayed in the live feed. The last step is to select the location for this object to be displayed. This field is a hierarchy tree where the admin can select Global/Regions/Countries/Operator Locations for these objects to be displayed. After all fields are populated, the admin clicks the save button to finish creating the object. The administrator can also create a leaderboard live feed object, the admin selects which leaderboard to be displayed (this selects from the table of active leaderboards from the leaderboard manager), then fills in fields for "Display Time (seconds)", and "Active/Inactive". The last step is to select the location for this object to be displayed. This field is a hierarchy tree where the admin can select Global/Regions/Countries/Operator Locations for these objects to be displayed. After all fields are populated, the admin clicks the save button to finish creating the object.

FIGS. 4Q and 4R illustrate editing and deleting Live Feed Objects. The system admin can manage the live feed through the live feed admin. For each of the objects in the live feed, the admin can change the order of the objects or edit the individual object itself. The down arrow moves the specified object down in the list, while the up arrow moves the object up in the list. The edit button opens the same window that is used to create a live feed object, but the admin can edit any of the fields and save it again. The system admin can delete live feed objects through the live feed admin. If the admin clicks the delete object next to a live feed object, then a dialog appears that asks if the admin is sure that they want to delete the object. If they select yes, then the object is deleted from the live feed. The live feed can displayed through the live feed interface.

Figure 5B:
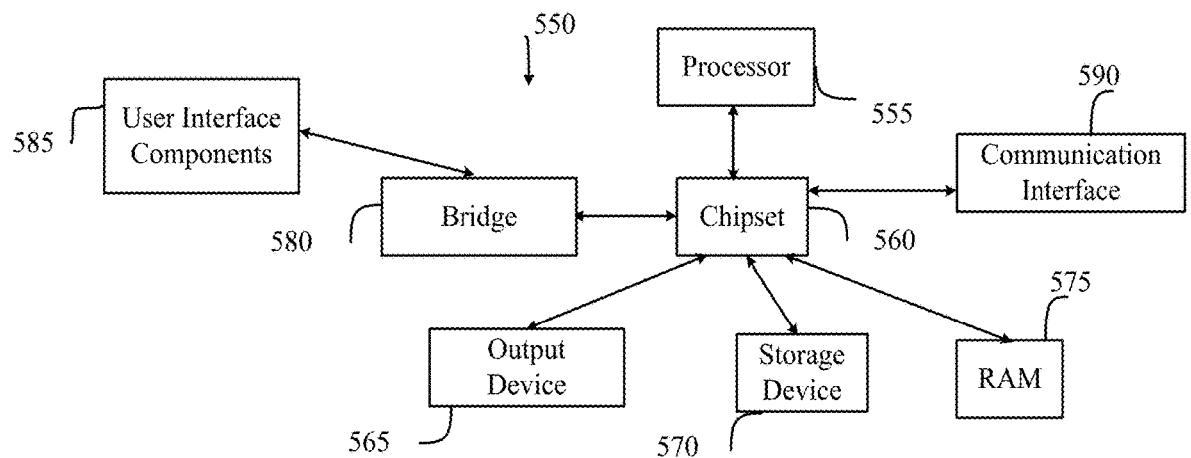
FIG. 5B depicts an example computer system chipset architecture.
Figure 5A:
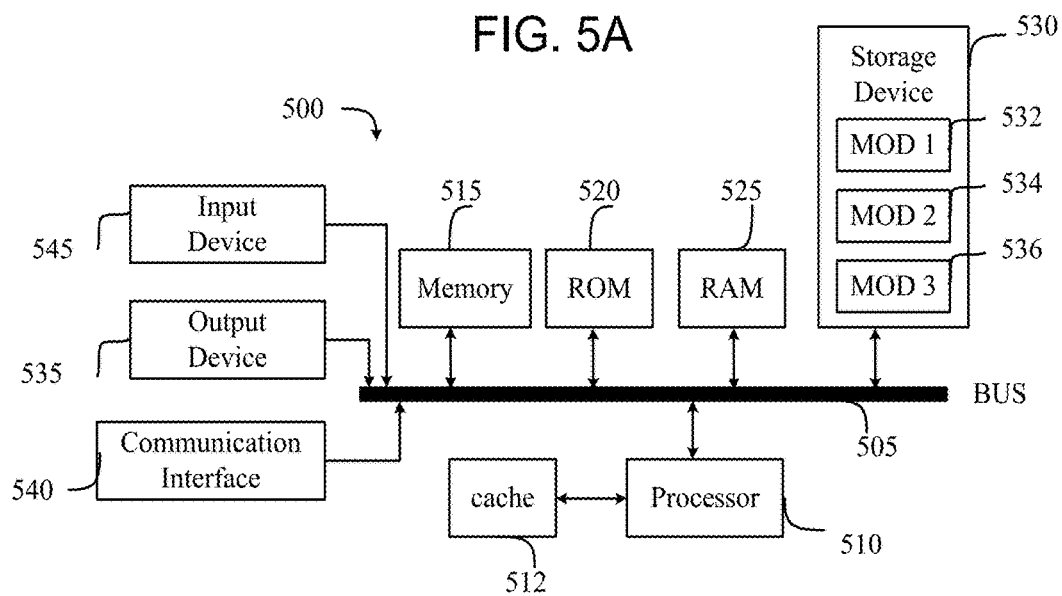
FIG. 5A depicts an example system bus computing system architecture.

FIG. 5A and FIG. 5B illustrate example system embodiments. The more appropriate embodiment will be apparent to those of ordinary skill in the art when practicing the present technology. Persons of ordinary skill in the art will also readily appreciate that other system embodiments are possible.

FIG. 5A illustrates a conventional system bus computing system architecture 500 wherein the components of the system are in electrical communication with each other using a bus 505. Exemplary system 500 includes a processing unit (CPU or processor) 510 and a system bus 505 that couples various system components including the system memory 515, such as read only memory (ROM) 520 and random access memory (RAM) 525, to the processor 510. The system 500 can include a cache of high-speed memory connected directly with, in close proximity to, or integrated as part of the processor 510. The system 500 can copy data from the memory 515 and/or the storage device 530 to the cache 512 for quick access by the processor 510. In this way, the cache can provide a performance boost that avoids processor 510 delays while waiting for data. These and other modules can control or be configured to control the processor 510 to perform various actions. Other system memory 515 may be available for use as well. The memory 515 can include multiple different types of memory with different performance characteristics. The processor 510 can include any general purpose processor and a hardware module or software module, such as module 1 532, module 2 534, and module 3 536 stored in storage device 530, configured to control the processor 510 as well as a special-purpose processor where software instructions are incorporated into the actual processor design. The processor 510 may essentially be a completely self-contained computing system, containing multiple cores or processors, a bus, memory controller, cache, etc. A multi-core processor may be symmetric or asymmetric.

To enable user interaction with the computing device 500, an input device 545 can represent any number of input mechanisms, such as a microphone for speech, a touch-sensitive screen for gesture or graphical input, keyboard, mouse, motion input, speech and so forth. An output device 535 can also be one or more of a number of output mechanisms known to those of skill in the art. In some instances, multimodal systems can enable a user to provide multiple types of input to communicate with the computing device 500. The communications interface 540 can generally govern and manage the user input and system output. There is no restriction on operating on any particular hardware arrangement and therefore the basic features here may easily be substituted for improved hardware or firmware arrangements as they are developed.

Storage device 530 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 525, read only memory (ROM) 520, and hybrids thereof.

The storage device 530 can include software modules 532, 534, 536 for controlling the processor 510. Other hardware or software modules are contemplated. The storage device 530 can be connected to the system bus 505. In one aspect, a hardware module that performs a particular function can include the software component stored in a computer-readable medium in connection with the necessary hardware components, such as the processor 510, bus 505, display 535, and so forth, to carry out the function.

FIG. 5B illustrates an example computer system 550 having a chipset architecture that can be used in executing the described method and generating and displaying a graphical user interface (GUI). Computer system 550 is an example of computer hardware, software, and firmware that can be used to implement the disclosed technology. System 550 can include a processor 555, representative of any number of physically and/or logically distinct resources capable of executing software, firmware, and hardware configured to perform identified computations. Processor 555 can communicate with a chipset 560 that can control input to and output from processor 555. In this example, chipset 560 outputs information to output device 565, such as a display, and can read and write information to storage device 570, which can include magnetic media, and solid state media, for example. Chipset 560 can also read data from and write data to RAM 575. A bridge 580 for interfacing with a variety of user interface components 585 can be provided for interfacing with chipset 560. Such user interface components 585 can include a keyboard, a microphone, touch detection and processing circuitry, a pointing device, such as a mouse, and so on. In general, inputs to system 550 can come from any of a variety of sources, machine generated and/or human generated.

Chipset 560 can also interface with one or more communication interfaces 590 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 555 analyzing data stored in storage 570 or 575. Further, the machine can receive inputs from a user via user interface components 585 and execute appropriate functions, such as browsing functions by interpreting these inputs using processor 555. It can be appreciated that example systems 500 and 550 can have more than one processor 510 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software. In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims. Moreover, claim language reciting "at least one of" a set indicates that one member of the set or multiple members of the set satisfy the claim.

We claim:

1. A performance tracking system comprising:
   an omnidirectional locomotion system configured with virtual reality games, an omnidirectional treadmill including a platform and support structure extending upward from the platform to support a user, and a sensor array, wherein the sensor array includes at least one inertial measurement unit attached to the user and at least one sensor attached to the omnidirectional locomotion system;
   the sensor array configured to output sensor data in response to physical interaction between the user, the omnidirectional treadmill, and a virtual reality game of the virtual reality games;
   the virtual reality game configured to output scoring data in response to receiving the sensor data; and
   a leaderboard development interface configured to ingest the scoring data from a virtual reality game of the virtual reality games and transmit scoring data to a database.

2. The system of claim 1, further comprising a user progression interface coupled to the sensor array and the database, the user progression interface configured to ingest sensor data from the sensor array and transmit achievement data to the database.

3. The system of claim 2, wherein the achievement data is used to determine an achievement level of a plurality of achievement levels, the achievement level stored to a user profile.

4. The system of claim 3, wherein each achievement level of the plurality of achievement levels has a threshold level, and the achievement level is determined when the achievement data exceeds or is equal to the threshold level.

5. The system of claim 1, further comprising:
a live feed system controller communicatively coupled to the database and a live feed creation GUI, wherein the live feed system controller transmits live feed objects for display.

6. The system of claim 5, wherein the display is where the omnidirectional locomotion system is located.

7. The system of claim 5, wherein the live feed system controller updates one or more of the live feed data objects as new scoring data and achievement data is received.

8. The system of claim 1, further comprising:
a leaderboard creation GUI configured to create a leaderboard GUI.

9. The system of claim 8, wherein the leaderboard creation GUI is configured to receive one or more inputs defining parameters of a leaderboard data object and configured to receive one or more inputs defining a set of filters for populating the leaderboard data object with data from the database.

10. The system of claim 8, further comprising:
a live feed creation GUI configured to receive one or more inputs defining parameters of a live feed data object, wherein newly created live feed data objects are stored in the database.

11. A leaderboard system comprising:
a plurality of omnidirectional locomotion systems configured with virtual reality games, omnidirectional treadmill including a platform and support structure extending upward from the platform to support a user, and a sensor array, wherein the sensor array includes at least one inertial measurement unit attached to the user and at least one sensor attached to the omnidirectional locomotion system;
the sensor array configured to output sensor data in response to physical interaction between the user, the omnidirectional treadmill, and a virtual reality game of the virtual reality games;
the virtual reality game configured to output scoring data in response to receiving the sensor data; and
a leaderboard development interface configured to ingest the scoring data from the plurality of omnidirectional locomotion systems and transmit scoring data to a database.

12. The system of claim 11, further comprising a plurality of user progression interfaces coupled to the sensor array of the plurality of omnidirectional locomotion systems, each of the user progression interfaces configured to ingest sensor data from the respective sensor array and transmit achievement data to the database.

13. The system of claim 11, further comprising:
a live feed system controller communicatively coupled to the database and a live feed creation GUI, wherein the live feed system controller transmits live feed objects for display.

14. The system of claim 13, wherein the display is located at a location of at least one of the plurality of omnidirectional locomotion systems.

15. The system of claim 13, wherein the live feed system controller updates one or more of the live feed data objects as new scoring data and achievement data is received from the plurality of omnidirectional locomotion systems.

16. A performance tracking system comprising:
an omnidirectional locomotion system configured with virtual reality games, omnidirectional treadmill including a platform and support structure extending upward from the platform to support a user, and a sensor array, wherein the sensor array includes at least one inertial measurement unit attached to the user and at least one sensor attached to the omnidirectional locomotion system;
the sensor array configured to output sensor data in response to physical interaction between the user, the omnidirectional treadmill, and a virtual reality game of the virtual reality games;
the virtual reality game configured to output scoring data in response to receiving the sensor data; and
a leaderboard development interface configured to ingest the scoring data from the sensor array and transmit achievement data to a database.

17. The performance tracking system of claim 16, wherein the achievement data is used to determine an achievement level of a plurality of achievement levels, the achievement level stored to a user profile.

18. The performance tracking system of claim 17, wherein each achievement level of the plurality of achievement levels has a threshold level, and the achievement level is determined when the achievement data exceeds or is equal to the threshold level.

* * * * *